J. P. BROPHY.
AUTOMATIC LATHE.
APPLICATION FILED MAR. 10, 1904.

948,680.

Patented Feb. 8, 1910.

5 SHEETS—SHEET 1.

WITNESSES:

INVENTOR:
John P. Brophy
by his attorney

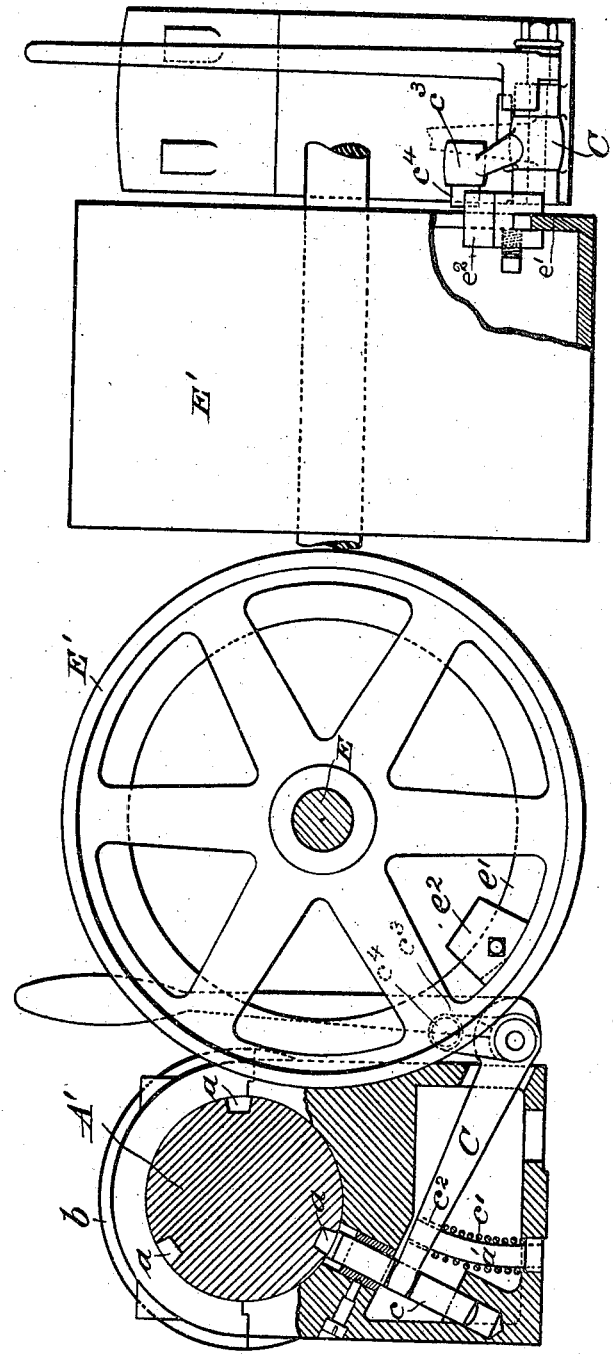

J. P. BROPHY.
AUTOMATIC LATHE.
APPLICATION FILED MAR. 10, 1904.

948,680.

Patented Feb. 8, 1910.
5 SHEETS—SHEET 3.

WITNESSES:
W. E. Merkel.
G. W. Saywell

INVENTOR:
John P. Brophy
by his attorney
J. D. Fay

J. P. BROPHY.
AUTOMATIC LATHE.
APPLICATION FILED MAR. 10, 1904.
948,680.
Patented Feb. 8, 1910.
5 SHEETS—SHEET 4.
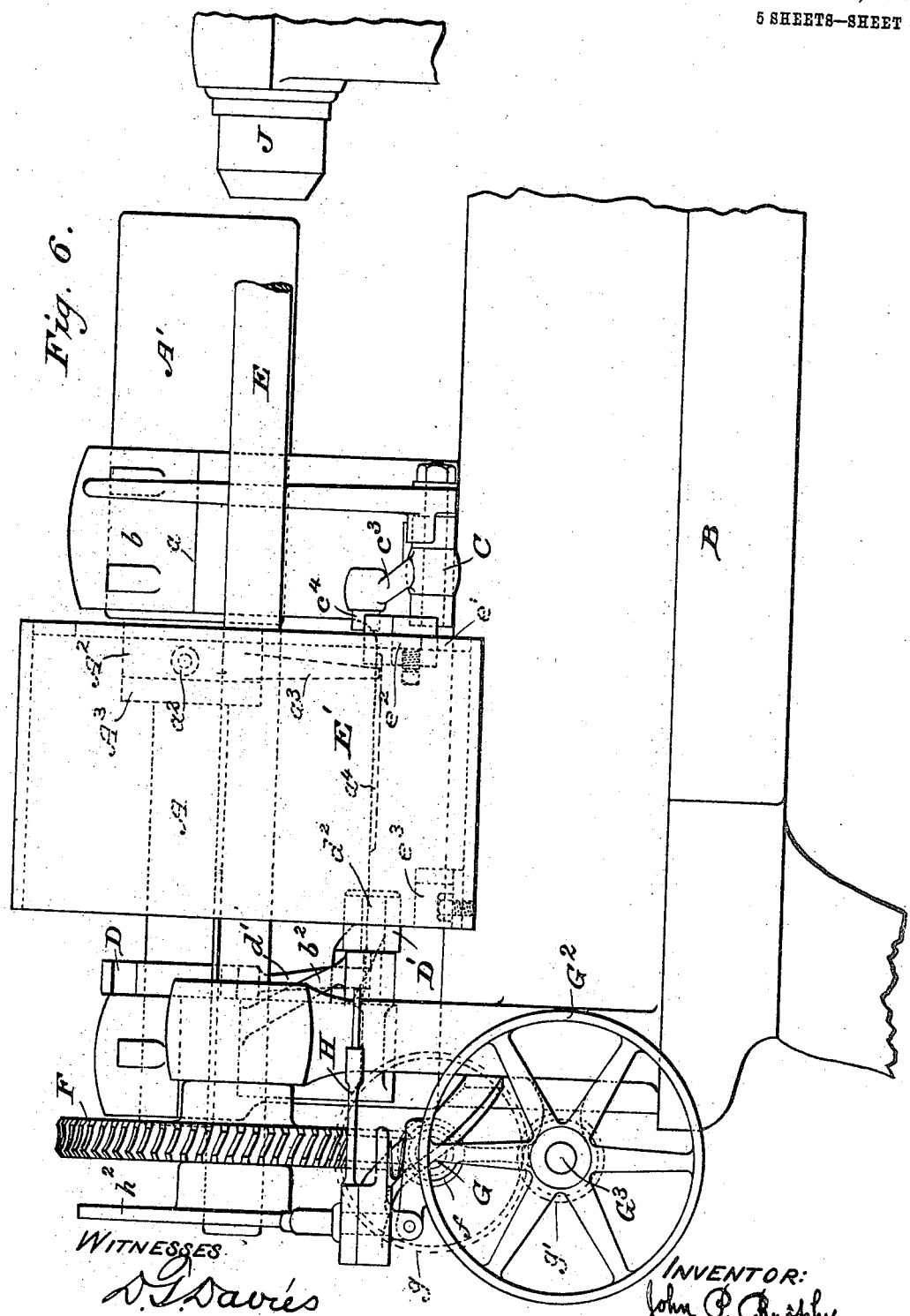

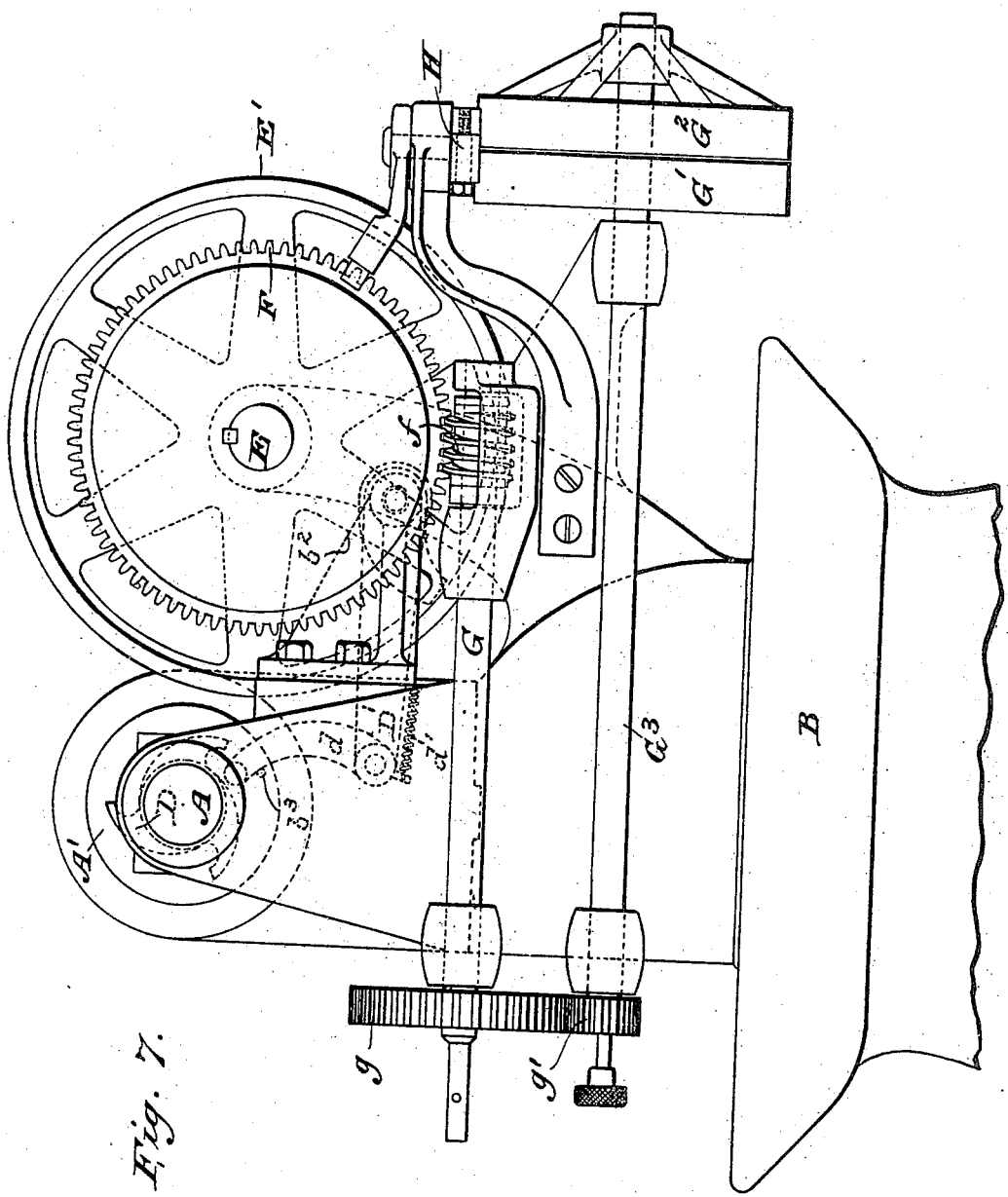

UNITED STATES PATENT OFFICE.

JOHN P. BROPHY, OF CLEVELAND, OHIO, ASSIGNOR TO CLEVELAND AUTOMATIC MACHINE COMPANY, OF CLEVELAND, OHIO, A CORPORATION OF NEW JERSEY.

AUTOMATIC LATHE.

948,680.  Specification of Letters Patent.  Patented Feb. 8, 1910.

Application filed March 10, 1904. Serial No. 197,431.

*To all whom it may concern:*

Be it known that I, JOHN P. BROPHY, a citizen of the United States, resident of Cleveland, county of Cuyahoga, and State of Ohio, have invented a new and useful Improvement in Automatic Lathes, of which the following is a specification, the principle of the invention being herein explained and the best mode in which I have contemplated applying that principle, so as to distinguish it from other inventions.

My invention relates to automatically operating lathes and particularly to that class of lathes in which the turret's axis of rotation is horizontal, and to the mechanism for rotating and reciprocating such turret.

The object of said invention is to provide mechanism for such a lathe of the type carrying a small number of tools in its turret, which will be economical in its construction and operation.

Said invention consists of means hereinafter fully described and particularly pointed out in the claims.

The annexed drawings and the following description set forth in detail certain mechanism embodying the invention, such disclosed means constituting but one of various mechanical forms in which the principle of the invention may be used.

Figure 1:
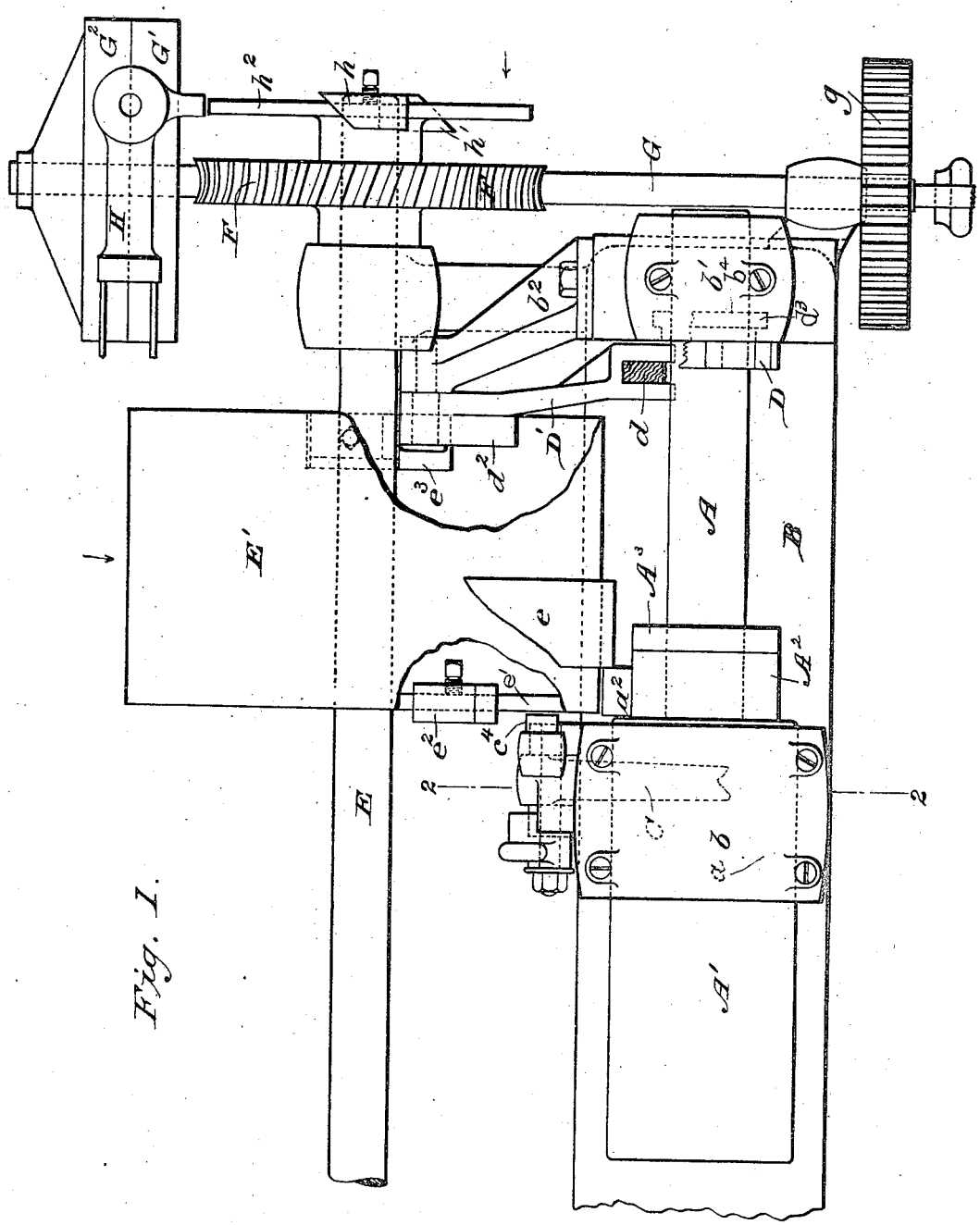
Figure 5:
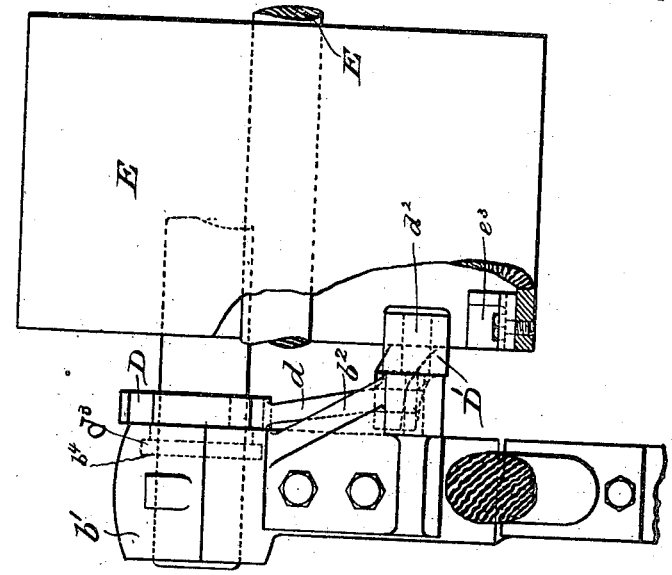
Figure 4:
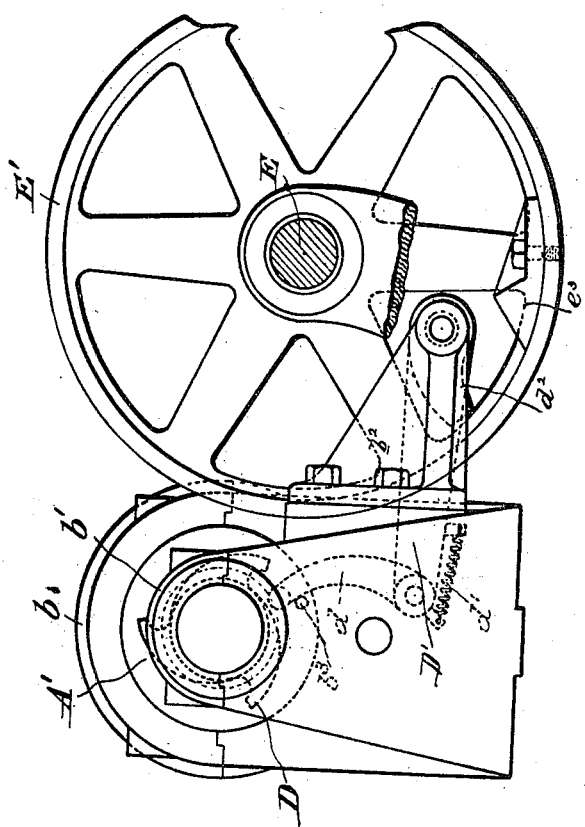

In said annexed drawings: Figure 1 represents a plan of the turret end of an automatic lathe embodying my invention, parts being shown broken away to disclose mechanism below same. Fig. 2 represents a vertical cross-section of such lathe taken upon the plane indicated by line 2—2, Fig. 1, the cam drum being shown in elevation in connection therewith, as well as portions cut by such plane. Fig. 3 represents a rear view of a portion of said lathe end, viewed as indicated by the arrow in Fig. 1, a portion of the cam drum being illustrated as broken away. Fig. 4 represents an end elevation of said lathe end, parts being illustrated as broken away, such view being taken in the direction indicated by the arrow in Fig. 1. Fig. 5 represents a rear view of the end portion of the lathe. Fig. 6 represents a complete rear view of the turret end of the lathe with the frame thereof broken away, and the work-holder shown in broken elevation. Fig. 7 represents a complete end elevation of the turret-end of the lathe with the frame thereof broken away.

Since my invention relates only to the turret end of the lathe, such end only has been illustrated, the automatically operating means for feeding stock toward the turret, together with cross-slides coöperating with such turret, having been omitted. Such omission will not, however, affect in any way a full and complete understanding of the invention on the part of those skilled in the art.

The turret-shaft A and turret A′ connected therewith are mounted in suitable bearings $b$ and $b'$ on the frame B, so as to be capable of rotation about and reciprocation in the direction of a horizontal axis. The turret A′ is provided with a series of longitudinally disposed superficial grooves $a$ corresponding in number with the number of tool-holes in the end of the turret, in this instance shown to be three. Each of these grooves is capable of being engaged by a bolt $c$ operating in a suitable bore in the frame and mounted upon the end of an oscillatory lever C, itself suitably mounted upon the rear of the frame, as shown in Fig. 2. The bolt is held normally in engagement with the grooves $a$, by means of a helical spring $c'$ mounted upon a stud $a'$ fixed to the frame, bent upon the arc of a circle having the axis of a lever C as a center, and passing through a bore $c^2$ formed in said lever. The latter is provided with an arm $c^3$ extending backwardly as shown in Fig. 3, the end of which is provided with an anti-friction roller $c^4$. It will thus be seen that the bolt $c$ locks the turret and turret shaft against rotation, and that such bolt may be caused to disengage the turret and permit of its rotation or partial rotation by engaging the roller $c^4$ and moving same toward the front of the machine so as to depress the bolt against the action of spring $c'$.

Near the outer end of the turret-shaft A and just inside the bearing $b'$ is rotatively fixed by means of a suitable feather a ratchet wheel D arranged to allow the shaft to slide longitudinally, the said shaft being provided with a suitable groove. Said wheel has a number of teeth corresponding with the number of tool holes in the turret, namely, three, Fig. 1, and is formed with a collar $d^3$ engaging a groove $b^4$ formed in bearing $b'$ to prevent lateral displacement. Upon the lower end of a bracket $b^2$ fixed to the frame, Figs. 1, 4, 5, 6 and 7, is pivoted an oscillatory arm D′ extending from the rear toward the front of the machine. Upon the forward end of this arm is pivoted a pawl $d$ which is adapted to engage the teeth of the ratchet-wheel D, on the up-stroke of the arm D′ when oscillated. Such engagement is properly effected by the provision of a helical spring $d'$ connected with the arm and pawl respectively as shown in Figs. 4 and 7, a suitable stop $b^3$ being provided and fixed to the adjacent frame portion to normally hold the end of the pawl in the vicinity of the ratchet wheel. The said arm is provided with a lateral lug $d^2$ the engagement of which from below will effect an upward movement of the arm D′, as will hereinafter be described.

Back of the turret-shaft, mounted in suitable bearings on the frame, and having its axis parallel with the turret axis, is a shaft E. This shaft is driven by worm-wheel F secured thereto and an engaging worm $f$ secured to a transverse shaft G which may be driven by either of two pulleys G′ $G^2$, Fig. 7, mounted upon a parallel shaft $G^3$ and connected with shaft G through suitable gear-wheels $g$ $g'$. Pulley G′ drives shaft G through the gears $g$ $g'$ while pulley $G^2$ drives same through differential gearing (not shown) at a reduced speed. A belt-shifter H pivotally-supported upon a suitable bracket is provided and shifts the driving belt from one to the other of said two pulleys. The shifter is actuated by cams $h$ and $h'$ mounted upon a disk $h^2$ secured to shaft E as will be readily understood, from an inspection of Fig. 1.

Upon shaft E is mounted a cam drum E′ which, through the medium of suitable cams, hereinafter described, periodically actuates the turret-shaft to reciprocate, and periodically actuates lever C and arm D′. Reciprocation of the turret shaft is effected through the medium of a sleeve $A^2$ mounted upon such turret shaft, between the turret A′ and a collar $A^3$ so as to be rotatably movable relatively to the shaft, and provided with a roller $a^2$ located in the path of movement of a series of removable cams fixed to the surface of drum E′ by any suitable means. One such cam is shown in Fig. 1, being designated by reference letter $e$. The sleeve $A^2$ is held in the proper position to secure the contact of such cam $e$ with roller $a^2$, by means of a downwardly projecting pin $a^3$ which slides in a groove or guideway $a^4$ formed in the frame B, Fig. 6. If desired the end of such pin may be provided with a roller, or, by providing a suitable guideway to co-act with roller $a^2$ such pin may be entirely dispensed with. The drum is so located and of a width such that one lateral edge falls in the vicinity of the roller $c^4$; such edge is formed with a flange $e'$ as shown in Fig. 3. Upon this flange are secured one or more adjustable cams $e^2$ in whose path of movement such roller $c^4$ normally lies, so that it will be seen that the rotation of the drum will effect the periodic actuation of the lever C and bolt $c$, and hence a time of periodic release or unlocking of the turret during which the latter may be rotated. The other side of said drum is provided with the required number of cams $e^3$, which are made removable and adjustable by any suitable means; such cam periodically engaging the lug $d^2$ to lift arm D′ and actuate pawl $d$ to engage the ratchet-wheel D and so partially rotate the turret shaft A and turret.

The cams $e$, $e^2$ and $e^3$ are all arranged relatively to each other so as to effect the operation of the described mechanism as follows: Assuming the turret and shaft to be in the position illustrated in Fig. 1, and the particular tool which has been brought into play to operate upon the work, to have just completed its operation, the continued rotation of the drum will bring a cam $e$ into engagement with roller $a^2$ to withdraw the turret and tool from the work, that is, move the turret shaft toward the right hand end of the frame, such cam being provided if such withdrawal is required at this point. Such withdrawal having been effected, a cam $e^2$ is thereupon brought into engagement with roller $c^4$ to unlock the turret. Following such operation a cam $e^3$ actuates arm D′ and so effects one third of a revolution of the turret shaft and turret. If at this point on the other hand only the partial rotation of the turret is required and not its withdrawal, the said particular cam $e$ is omitted. The cam $e^3$ now having passed, arm D′ drops back into its normal position by gravity, cam $e^2$ having already released lever C, bolt $c$ engages the next groove $a$ and locks the turret against rotation. A second cam $e$ is now brought into play to advance the turret and shaft so as to bring the next tool into operation upon the work. During such described operation the belt shifter is operated automatically to change the speed of rotation of the cam drum to correspond with the character of movement required, the slow speed being usually effected when the tools are operating upon the work, and the high speed during such times as the turret is moved to change the position of a tool as will be understood. Such effect is produced by a proper provision of number and location of cams $h$ and $h'$.

It is thus seen that the mechanism described permits a considerable range in variety of cycles of action, each particular cycle of operation being permitted to be effected without the necessity of unnecessary movements on the part of the turret. Such mechanism is particularly adapted for use in a lathe having not more than three tool holes in its turret. The principle of operation might be applied to a lathe carrying more than three tools, but would not be advantageous by reason of the fact that so many cams *e* on the drum E' would be required that it would be necessary to make the diameter of said drum excessively large and hence detract from the general design of the machine from a mechanical standpoint.

Other modes of applying the principle of my invention may be employed instead of the one explained, change being made as regards the mechanism herein disclosed provided the means stated by any one of the following claims or the equivalent of such stated means be employed.

I therefore particularly point out and distinctly claim as my invention—

1. In an automatic lathe, the combination of a turret shaft rotatably and longitudinally reciprocably mounted, a second shaft parallel with and laterally adjacent to said turret shaft, a roller carried by said shaft, a spring-pressed bolt adapted to engage said turret to lock the same against rotation, pawl and ratchet means for rotating said turret, a drum mounted on said second shaft, cams on the face of said drum adapted to directly engage the roller carried by said turret shaft to reciprocate the latter, and other cams respectively adapted to withdraw said bolt and thereupon actuate said pawl and ratchet means to rotate said turret.

2. In an automatic lathe, the combination of a turret shaft rotatably and longitudinally reciprocably mounted, a second shaft parallel with and laterally adjacent to said turret shaft, a roller carried by said shaft, a spring-pressed bolt adapted to engage said turret to lock the same against rotation, a lever adapted to withdraw said bolt, an oscillatory arm bearing a pawl at its outer end, a ratchet on said turret shaft adapted to be engaged by said pawl, whereby said shaft is rotated, a drum mounted on said second shaft with its respective edges contiguous to said lever and arm, cams on the faces of said drum adapted to directly engage the roller carried by said turret shaft to reciprocate the latter, and other cams on the lateral edges of said drum respectively adapted to oscillate said lever and arm to withdraw said bolt and thereupon rotate said turret.

Signed by me, this 8" day of March, 1904.

JOHN P. BROPHY.

Attested by—
G. W. SAYWELL,
A. E. MERKEL.